US008812689B2

(12) United States Patent
Higdon et al.

(10) Patent No.: US 8,812,689 B2
(45) Date of Patent: Aug. 19, 2014

(54) SYSTEM AND METHOD FOR ROTATING A GATEWAY ADDRESS

(75) Inventors: William W. Higdon, Huntsville, AL (US); Jonathan Dirk Caudill, Madison, AL (US)

(73) Assignee: The Boeing Company, Chicago, IL (US)

( * ) Notice: Subject to any disclaimer, the term of this patent is extended or adjusted under 35 U.S.C. 154(b) by 84 days.

(21) Appl. No.: 13/399,432

(22) Filed: Feb. 17, 2012

(65) Prior Publication Data

US 2013/0219071 A1 Aug. 22, 2013

(51) Int. Cl.
*G06F 15/16* (2006.01)

(52) U.S. Cl.
USPC .............. 709/227; 709/228; 726/2; 726/22

(58) Field of Classification Search
CPC ............ H04L 63/1491; H04L 63/18; H04L 29/08576
USPC ............ 709/223, 225, 226, 227, 228, 229; 726/2, 22
See application file for complete search history.

(56) References Cited

U.S. PATENT DOCUMENTS

| 7,114,005 | B2 * | 9/2006 | McDaniel | 709/245 |
|---|---|---|---|---|
| 7,774,843 | B1 * | 8/2010 | Prakash | 726/22 |
| 7,917,961 | B2 * | 3/2011 | McIsaac et al. | 726/28 |
| 7,926,104 | B1 * | 4/2011 | Sundaram et al. | 726/22 |
| 8,284,775 | B2 * | 10/2012 | Chu et al. | 370/392 |
| 8,363,693 | B2 * | 1/2013 | Fujiwara | 375/131 |
| 2003/0069981 | A1 * | 4/2003 | Trovato | 709/228 |
| 2003/0149783 | A1 * | 8/2003 | McDaniel | 709/231 |
| 2004/0088385 | A1 * | 5/2004 | Blanchet et al. | 709/220 |
| 2004/0103205 | A1 * | 5/2004 | Larson et al. | 709/229 |
| 2007/0136601 | A1 * | 6/2007 | Kwon et al. | 713/182 |
| 2008/0034201 | A1 * | 2/2008 | Munger et al. | 713/153 |
| 2008/0307254 | A1 * | 12/2008 | Shimmura | 714/10 |
| 2009/0003298 | A1 * | 1/2009 | Chu et al. | 370/338 |
| 2010/0175131 | A1 | 7/2010 | Sheymov | |
| 2010/0333188 | A1 * | 12/2010 | Politowicz | 726/13 |
| 2011/0255570 | A1 * | 10/2011 | Fujiwara | 375/133 |

(Continued)

FOREIGN PATENT DOCUMENTS

WO WO-2003/032603 A2 4/2003

OTHER PUBLICATIONS

Gravemen, et al., Using IPsec to Secure IPv6-in-IPv4 Tunnels, May 2007, Network Working Group, Request for Comments: 4891.*

(Continued)

*Primary Examiner* — Jimmy H Tran
(74) *Attorney, Agent, or Firm* — Alston & Bird LLP

(57) ABSTRACT

A client device, a gateway and a corresponding method are provided in order to increase the security of a network to which access is provided via a gateway. The address of the gateway may rotate, e.g., change, such that hackers or other individuals or devices that should not have access to the network will experience much greater difficulty in securing the address of the gateway and accessing the network, at least for any extended period of time. By ensuring that both the client device and the gateway are synchronized in regard to the rotation of the address of the gateway, however, the client device may still properly address the gateway and therefore access the network, even as the address of the gateway rotates. Different operating systems may also be associated with some of the different addresses of the gateway in order to increase the security of the network.

19 Claims, 5 Drawing Sheets

(56) References Cited

U.S. PATENT DOCUMENTS

| | | |
|---|---|---|
| 2011/0277032 A1 | 11/2011 | Vargas |
| 2013/0104228 A1* | 4/2013 | Burnham et al. ............... 726/22 |
| 2013/0139221 A1* | 5/2013 | Gundavelli et al. ............... 726/4 |

OTHER PUBLICATIONS

Shi, L. et al., *DoS Evading Mechanism upon Service Hopping*, IEEE (2007) pp. 119-122.

Shi, L. et al., *Port and Address Hopping for Active Cyber-Defense*, Intelligence and Security Informatics, Lecture Notes in Computer Science; LNCS (2007) pp. 296-299.

Sifalakis, M. et al., *Network Address Hopping*, IEEE vol. 3 (2005) pp. 1518-1523.

Zhao, C. et al., *Technique and Application of End-Hopping in Network Defense*, 2010 First ACIS International Symposium on, IEEE (2010) pp. 266-270.

International Search Report and Written Opinion for Application No. PCT/US2013/020694 dated Mar. 18, 2013.

"Cyber Security Research and Development Broad Agency Announcement (BAA) *BAA* 11-02"; Science and Technology Security & Trust; Published Jan. 26, 2011; pp. 1-78.

* cited by examiner

SYSTEM AND METHOD FOR ROTATING A GATEWAY ADDRESS

TECHNOLOGICAL FIELD

A system and method are provided according to an example embodiment for defining the address of a gateway and, more particularly, for causing the address of the gateway to rotate, thereby enhancing the security of the network that is accessible via the gateway.

BACKGROUND

Access to a network, such as a private network, e.g., an intranet or other internal network, may be provided by a gateway. The gateway is positioned outside of the firewall that protects the network with the gateway configured to receive messages from various devices that are directed to the network and to forward those messages to the network, if appropriate. A gateway generally has a static address, such as a static Internet Protocol (IP) address. In order to access the gateway and, in turn, the network, a device, such as a computer, a mobile telephone, a personal digital assistant (PDA) or the like, may query a domain name server (DNS) for the address of the gateway. The DNS may provide the device with the address of the gateway and the device may thereafter communicate with the gateway and, in turn, with the network via the address, such as an IP address, supplied by the DNS.

Since the address of the gateway is static, hackers or other individuals or devices that should not have access to the network may determine the address of the gateway. Once the address of the gateway has been determined, a hacker or other individual or device that should not have access to the network may communicate with the network via messages properly addressed to the gateway. As such, hackers or other individuals or devices that should not have access to the network may access the network and may, for example, access data or other information stored within the network, thereby compromising the security of the network.

BRIEF SUMMARY

A client device, a gateway and a corresponding method are provided according to example embodiments of the present disclosure in order to increase the security of a network to which access is provided via a gateway. In this regard, the address of the gateway may rotate, e.g., change, such that hackers or other individuals or devices that should not have access to the network will experience much greater difficulty in securing the address of the gateway and accessing the network, at least for any extended period of time. By ensuring that both the client device and the gateway are synchronized in regard to the rotation of the address of the gateway, the client device may still properly address the gateway and therefore access the network, even as the address of the gateway rotates. By associating different operating systems with different addresses of the gateway, the security of the network may be further increased in accordance with some embodiments of the present disclosure.

A client device is provided in accordance with one embodiment that includes a processor configured to query a plurality of mapping devices to solicit an address of a gateway. The processor of this embodiment is also configured to receive the address of the gateway from one of the mapping devices and to cause communication to be established with the gateway utilizing the address received from the respective one of the mapping devices. The processor of this embodiment is also configured to receive an indication that the address of the gateway has changed to a different address and to thereafter cause communication to be established with the gateway utilizing the different address. In this regard, the processor of one embodiment may be further configured to repeatedly receive the indication that the address of the gateway has changed to a different address and to thereafter cause communication to be established with the gateway utilizing the different address. By permitting the address of the gateway to change, the security provided by the gateway to the network may be enhanced while still allowing the client device to communicate via the gateway with the network as a result of the synchronization between the gateway and the client device regarding the rotation of the address of the gateway.

The processor of one embodiment may be further configured to receive responses from one or more other mapping devices in response to the query that indicate that the one or more other mapping devices do not have a valid address for the gateway. The processor may be further configured to communicate with the gateway by tunneling a payload of a first protocol, such as Internet Protocol version 6 (IPv6) within a packet of a second protocol, such as Internet Protocol version 4 (IPv4). The payload may include a Media Access Control (MAC) address of the client device in order to permit authentication of the client device by the gateway.

In another embodiment, a method is provided that includes querying a plurality of mapping devices to solicit an address of a gateway. The method may also receive the address of the gateway from one of the mapping devices and may establish communication, utilizing a processor, with a gateway utilizing the address received from the respective one of the mapping devices. The method of this embodiment may also receive an indication that the address of the gateway has changed to a different address and thereafter communicate with the gateway utilizing the different address. In one embodiment, the method may repeatedly receive an indication that the address of the gateway has changed to a different address and may thereafter cause communication to be established with the gateway utilizing the different addresses.

The method of one embodiment may also receive responses from one or more other mapping devices in response to the query that indicate that the one or more other mapping devices do not have a valid address for the gateway. The method of one embodiment may communicate with the gateway by tunneling a payload of a first protocol, such as Internet Protocol version 6 (IPv6) within a packet of a second protocol, such as Internet Protocol version 4 (IPv4). The payload of one embodiment may include a Media Access Control (MAC) address of the client device to permit authentication of the client device by the gateway.

In a further embodiment, a gateway is provided that includes a processor configured to define an address of the gateway, to receive a message from a client device utilizing the address defined by the gateway and to thereafter establish communication with the client device utilizing the address defined by the gateway. The processor of this embodiment is also configured to rotate the address to the gateway by changing to a different address, causing the client device to be notified that the address to the gateway has changed to the different address and thereafter communicating with the client device utilizing the different address. In one embodiment, the processor of the gateway may be further configured to repeatedly rotate the address to the gateway.

The processor of the gateway may be further configured to communicate with the client device by tunneling a payload of a first protocol, such as Internet Protocol version 6 (IPv6) with a packet of a second protocol, such as Internet Protocol version 4 (IPv4). The processor of the gateway of one embodiment may also be configured to authenticate the client device based upon a Media Access Control (MAC) address of the client device included within communications received from the client device. The processor of the gateway of one embodiment may also be configured to cause the client device to be notified that the address of the gateway has changed by causing a plurality of mapping devices to be notified that the address to the gateway has been changed to the different address, such that one or more of the mapping devices may then notify the client device of the change in the address of the gateway. In one embodiment, the address of the gateway and the different address of the gateway may be associated with different operating systems. In this embodiment, the processor of the gateway may be further configured to operate in accordance with a different operating system while the gateway has the different address than while the gateway has the address. By changing operating systems, the security of the network may be further enhanced, albeit in a manner that is transparent to the client device.

BRIEF DESCRIPTION OF THE DRAWINGS

Figure 1:
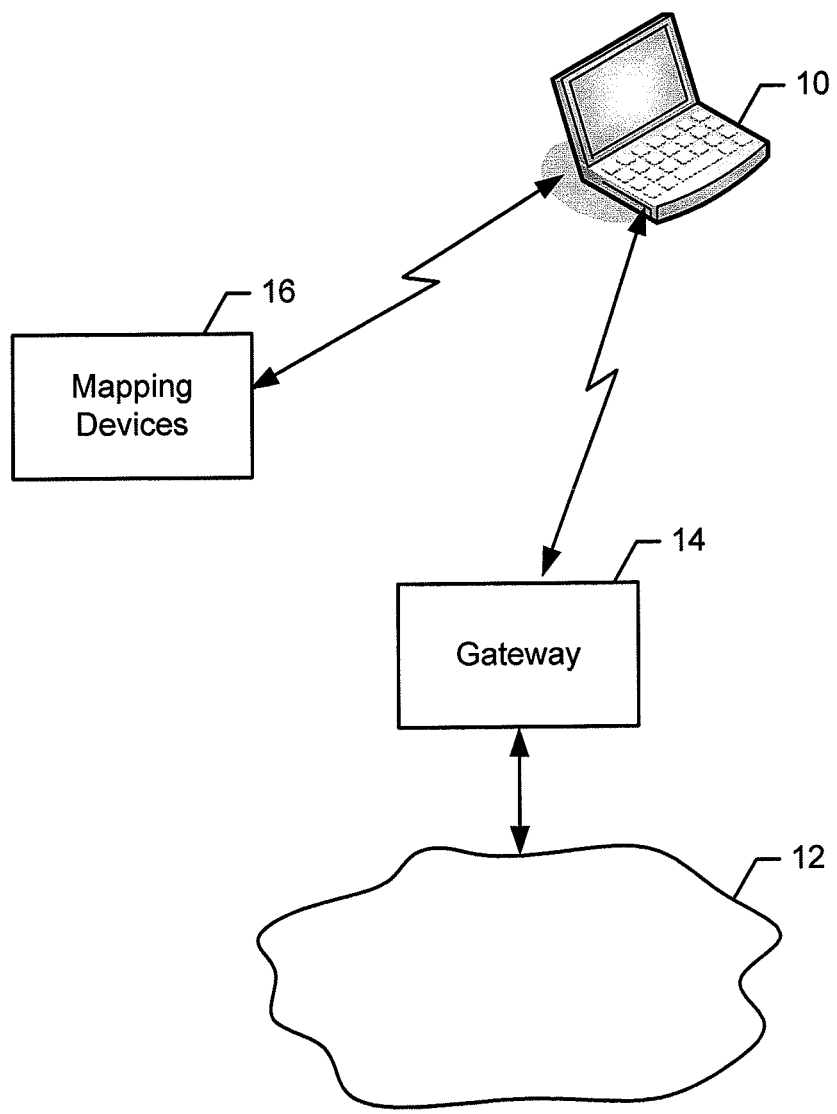
Figure 2:
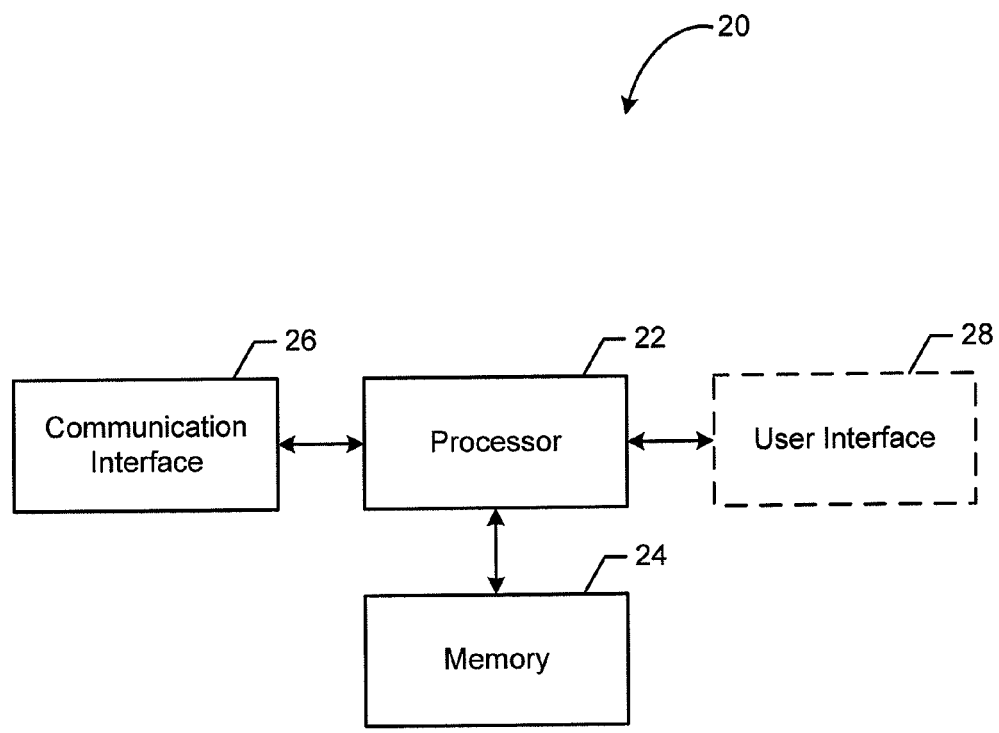
Figure 3:
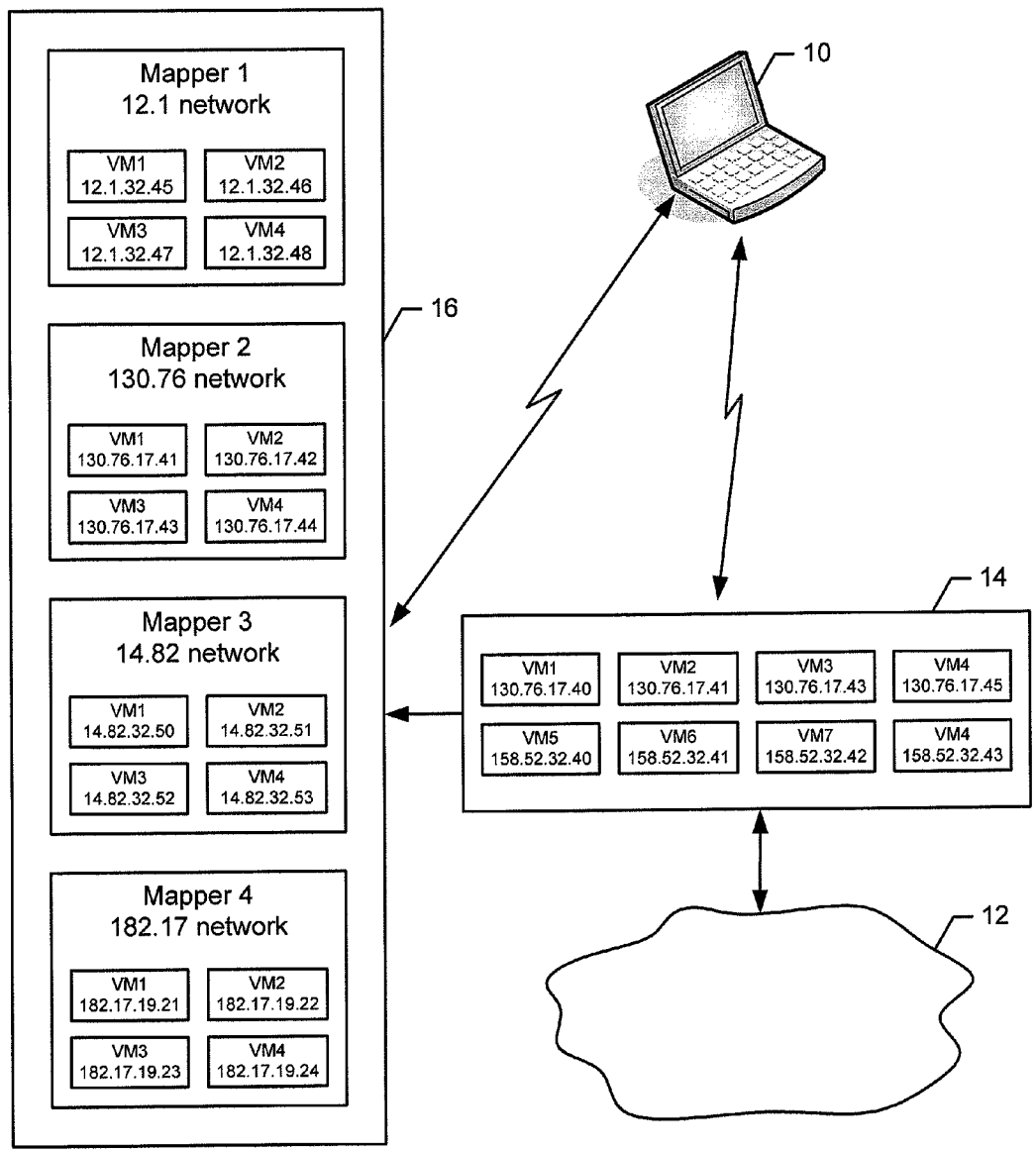
Figure 4:
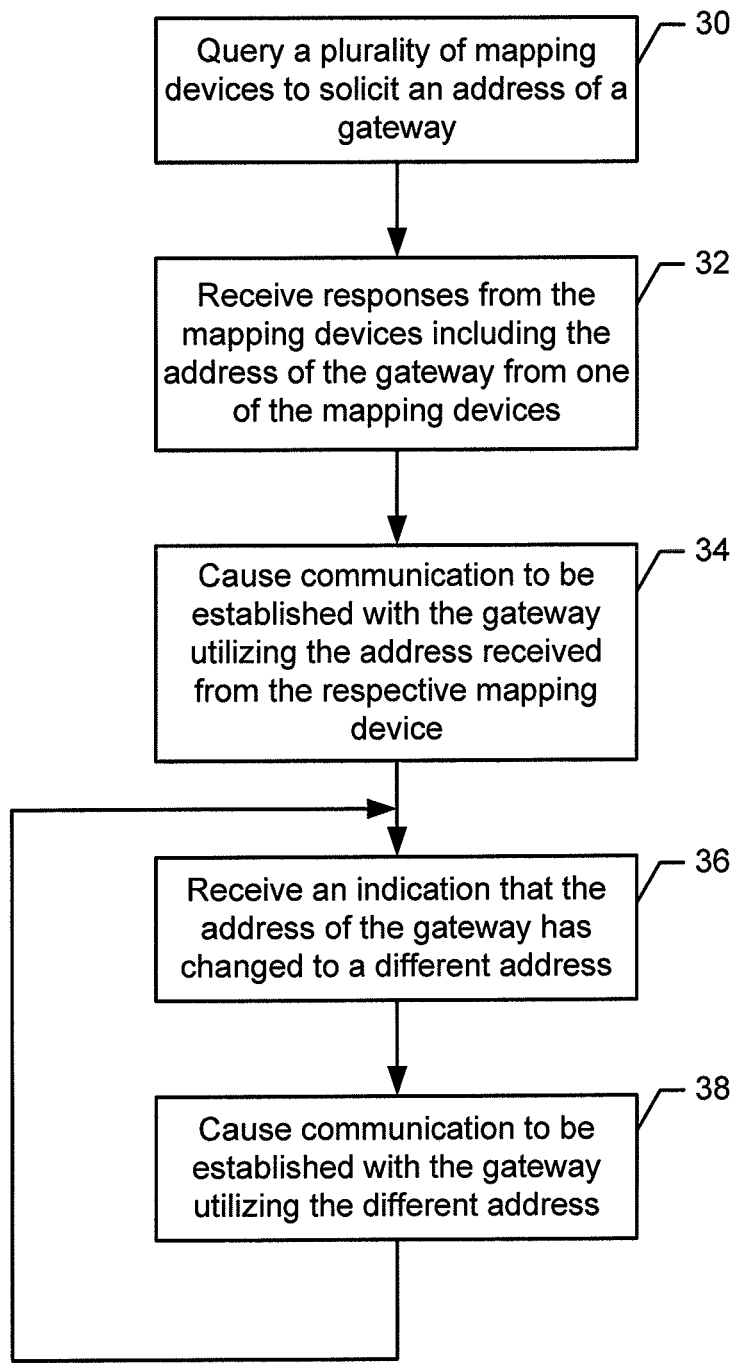
Figure 5:
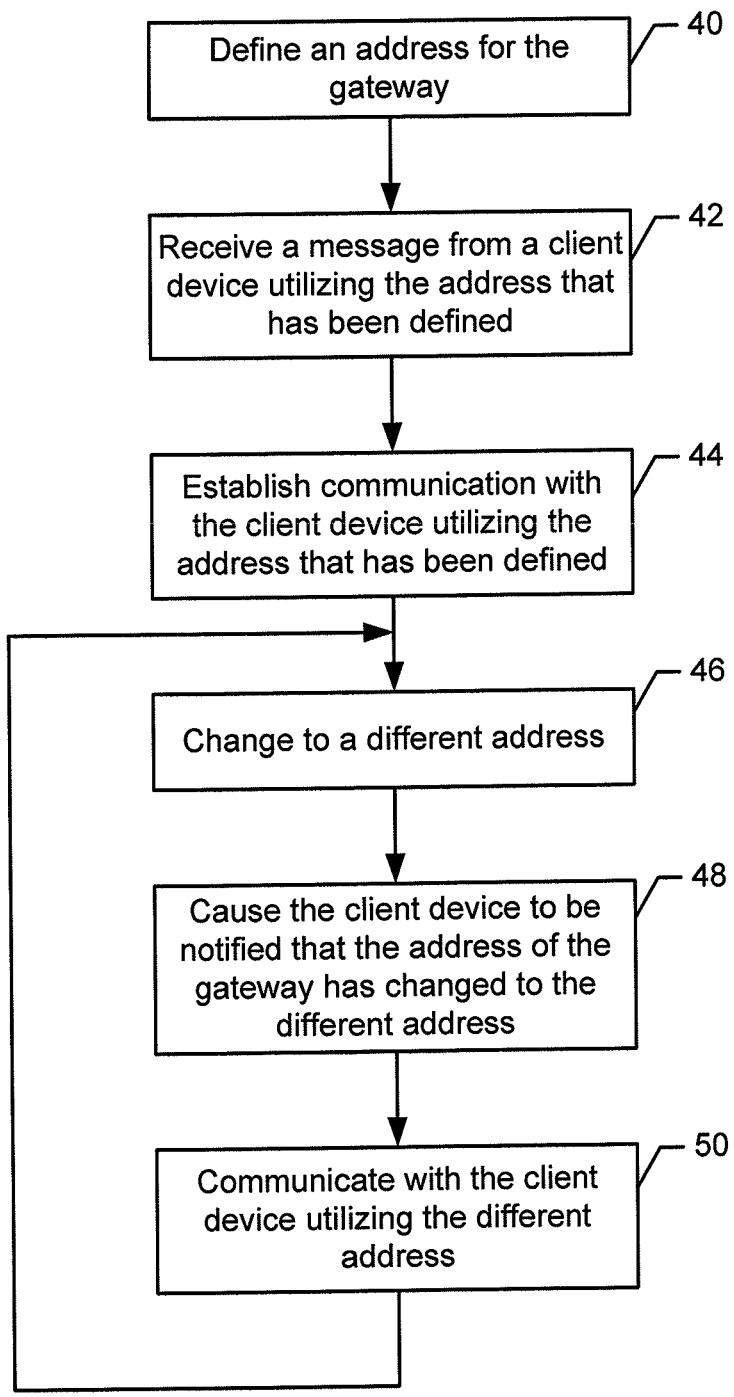

Having thus described certain example embodiments of the present disclosure in general terms, reference will now be made to the accompanying drawings, which are not necessarily drawn to scale, and wherein:

FIG. 1 is a block diagram of a system including a client device, a plurality of mapping devices and a gateway for controlling access to a network in accordance with an example embodiment;

FIG. 2 is a block diagram of an apparatus that may be embodied by a client device and/or a gateway and that may be specifically configured in accordance with an example embodiment of the present disclosure;

FIG. 3 is a more detailed block diagram of the system of FIG. 1;

FIG. 4 is a flow chart of the operations performed by a client device in accordance with one embodiment; and FIG. 5 is a flow chart of the operations performed by a gateway in accordance with one embodiment.

DETAILED DESCRIPTION

The present disclosure now will be described more fully hereinafter with reference to the accompanying drawings, in which some, but not all embodiments are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout.

Referring now to FIG. 1, a system is provided for controlling access by a client device 10 to a network 12. The client device 10 may be any of a wide variety of devices configured to communicate with a network, such as a computer, a tablet, a mobile telephone, a PDA or the like. Additionally, the network 12 with which the client device 10 is to communicate may be any of a variety of networks, but, in general, is a private network that it not generally accessible to the public, such as an intranet, an internal network or the like. As shown in FIG. 1, access to the network 12 may be controlled by a gateway 14. In this regard, the gateway 14 may be positioned outside of the firewall that otherwise protects the network 12 so as to communicate with the various devices, including client device 10, that endeavoring to communicate with the network 12. The client device 10 and the gateway 14 may communicate in various manners, such as via a wireless connection, a wireline connection or some combination thereof.

In order to communicate with the gateway 14 and, in turn, the network 12, the client device 10 determines the address of the gateway and thereafter transmits messages to the gateway, at least some of which are intended for receipt by the network. The address of the gateway 14 is not provided by a DNS. Instead, the system may also include a plurality of mapping devices 16 that determine the address of the gateway 14, even as the address of the gateway rotates, e.g., changes. As such, the client device 10 may communicate with the mapping devices 16 in order to determine the address, such as the IP address, of the gateway 14 in order to properly direct messages to the gateway and, in turn, to the network 12. The client device 10 and the plurality of mapping devices 16 may communicate in various manners, including via a wireless connection, a wireline connection or come combination thereof. Although not depicted in FIG. 1, the gateway 14 and the mapping devices 16 may also be in communication as shown in FIG. 3 and as described below in some embodiments in order to facilitate synchronization of the rotation of the address of the gateway.

As described below, the client device 10 may determine the address of the gateway 14 by querying the plurality of mapping devices 16 and may thereafter communicate with the gateway, and, in turn, with the network 12 utilizing the address. In an instance in which the address of the gateway 12 has changed, the client device 10 may be notified of the change in the address of the gateway such that subsequent communication between the client device and the gateway and, in turn, with the network 12 may be conducted utilizing the updated address of the gateway. This process of rotating the address of the gateway 14 while maintaining communications between the client device 10 and the network 12 via the gateway may continue, thereby reducing the likelihood that a hacker or other individual or device that should not have access to the network will be able to determine the address of the gateway in an effort to communicate with the network, at least for any appreciable length of time since the address of the gateway will repeatedly rotate, e.g., change.

Both the client device 10 and the gateway 14 may be embodied as or otherwise include an apparatus 20 as generically represented by the block diagram of FIG. 2. In this regard, the apparatus 20 may be configured to maintain address synchronization between the client device 10 and the gateway 14 as the address of the gateway rotates, thereby providing enhanced security to the network 12 associated with the gateway. An example embodiment will be described hereinafter with reference to the apparatus of FIG. 2. The apparatus may be employed, for example, by a client device 10 and/or a gateway 14. However, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with processing circuitry that is configurable to perform actions in accordance with example embodiments described herein. The processing circuitry may be configured to perform data processing, application execution and/or other processing and management services according to an example embodiment. In an example embodiment, the processing circuitry may include a processor 22 and memory 24 that may be in communication with or otherwise control a communication interface 26 and, in some cases, a user interface 28. As such, the processing circuitry may be embodied as a circuit chip (e.g., an integrated circuit chip) configured (e.g., with hardware, software or a combination of hardware and software) to perform operations described herein.

The user interface 28 (if implemented) may be in communication with the processing circuitry to receive an indication of a user input at the user interface and/or to provide an audible, visual, mechanical or other output to the user. As such, the user interface 28 in the context of a client device 10 may include, for example, a keyboard, a mouse, a joystick, a display, a touch screen, a microphone, a speaker, and/or other input/output mechanisms. In an example embodiment in which the apparatus 20 is embodied by the gateway 14, the user interface 28 may be fully implemented, limited, remotely located or eliminated. Indeed, while the apparatus 20 in the context of a client device 10 may include a user interface 28, the apparatus in the context of the gateway 14 may not include a user interface or the user interface may be disposed at another device, e.g., at a computer terminal, that may be in communication with the processing circuitry via the communication interface 26.

The communication interface 26 may include one or more interface mechanisms for enabling communication with other devices and/or networks. In some cases, the communication interface 26 may be any means such as a device or circuitry embodied in either hardware, or a combination of hardware and software that is configured to receive and/or transmit data. In this regard, the communication interface 26 may include, for example, an antenna (or multiple antennas) and supporting hardware and/or software for enabling communications with a wireless communication network and/or a communication modem or other hardware/software for supporting communication via cable, digital subscriber line (DSL), USB, Ethernet or other methods.

In an example embodiment, the memory 24 may include one or more non-transitory memory devices such as, for example, volatile and/or non-volatile memory that may be either fixed or removable. The memory 24 may be configured to store information, data, applications, instructions or the like for enabling the apparatus 20 to carry out various functions in accordance with embodiments of the present disclosure. For example, the memory 24 could be configured to store instructions for execution by the processor 22. In some cases, the memory 24 may be in communication with the processor 22 via a bus for passing information among components of the apparatus 20.

The processor 22 may be embodied in a number of different ways. For example, the processor 20 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 22 may be configured to execute instructions stored in the memory 24 or otherwise accessible to the processor. As such, whether configured by hardware or by a combination of hardware and software, the processor 22 may represent an entity, e.g., physically embodied in circuitry, capable of performing operations according to embodiments of the present disclosure while configured accordingly. Thus, for example, when the processor 22 is embodied as an ASIC, FPGA or the like, the processor may be specifically configured hardware for conducting the operations described herein. Alternatively, as another example, when the processor 22 is embodied as an executor of software instructions, the instructions may specifically configure the processor to perform the operations described herein.

Referring now to FIG. 3, a system in accordance with an example embodiment is shown in more detail. The gateway 14, such as the processor 22 of the gateway, may define its address. In the illustrated embodiment, the gateway 14 may define a plurality of different addresses, one of which is a valid address and the remainder of which are invalid addresses. The gateway 14 may define various types of addresses, but, in one embodiment, defines an IP address. Although the generation of the addresses may be accomplished in various manners, the gateway 14 and, more particularly, the processor 22 of one embodiment of the gateway may include a plurality of virtual machines (VMs), each of which is configured to generate a respective address for the gateway with one of the addresses being valid and the remainder of the addresses being invalid. While a gateway 14 having eight virtual machines (designated VM1, VM2, . . . VM8) is illustrated in FIG. 3, the gateway of this embodiment may have any number of virtual machines and, therefore, may generate any number of addresses, only one of which is valid.

As also shown in FIG. 3, the plurality of mapping devices 16 may also generate a plurality of candidate addresses for the gateway 14. Although four mapping devices 16 (designated Mapper 1, Mapper 2, Mapper 3 and Mapper 4) are illustrated in the embodiment of FIG. 3, the system may include any number of mapping devices. Each mapping device 16 may, in turn, include a processor for generating at least one candidate address for the gateway 14. In the illustrated embodiment, each mapping device 16 generates four candidate addresses for the gateway 14. However, each mapping device 16 may generate any number of candidate addresses for the gateway 14 and, indeed, some of the mapping devices may generate a different number of candidate addresses for the gateway than others of the mapping devices. The mapping devices 16 of the illustrated embodiment generate IP addresses which may, for example, consist of four fields separated by periods. In the illustrated embodiment, each mapping device 16 generates a plurality of candidate addresses in which the first two fields are identical such that each mapping device is referenced as a network that is defined by the first two fields of the candidate addresses. By way of example, Mapper 1 of the illustrated embodiment generates four candidate addresses that each begin with 12.1 such that Mapper 1 is referenced as a 12.1 network. As another example, Mapper 2 generates four candidate addresses that each begins with 130.76 such that Mapper 2 is also referenced as the 130.76 network.

The plurality of mapping devices 16 can be configured to generate the candidate addresses in various manners. In one embodiment, however, the plurality of mapping devices 16 each include a processor which, in turn, includes one or more virtual machines, each of which is configured to generate a respective candidate address. In the illustrated embodiment, for example, each mapping device 16 includes four virtual machines (designated VM1, VM2, VM3 and VM4), each of which is configured to generate a respective candidate address for the gateway 14.

Like the gateway 14, the plurality of mapping devices 16 generate a plurality of candidate addresses for the gateway, one of which is valid and the remainder of which are invalid. In this regard, the valid address generated by the gateway 14 and the valid address generated by a respective one of the mapping devices 16 are identical, such as 130.76.70.43 as generated by VM3 of the gateway and VM3 of Mapper 2. Additionally, the gateway 14, such as the processor 22 of the gateway, and the plurality of mapping devices 16 are configured to be synchronized in order to generate the same valid address for the gateway at each instance in time, while also generating a plurality of invalid addresses. Indeed, the gateway 14 and the plurality of mapping devices 16 may be configured to generate a valid address and a plurality of invalid addresses in accordance with a predefined algorithm, thereby ensuring that the gateway and the plurality of mapping devices concurrently generate the same valid address for the gateway.

With reference now to FIG. 4, the operations of a client device 10 in order to determine the address of a gateway 14 and, in turn, communicate via the gateway with the network 12 are illustrated. Initially, the client device 10, such as the processor 22 embodied by the client device, either directly or via direction of the communication interface 26 by the processor, may query the plurality of mapping devices 16 to solicit an address to the gateway 14. See block 30. The client device 10, such as the processor 22, either directly or from the communication interface 26, may receive the address of the gateway 14 from one of the mapping devices 16. See block 32. In one embodiment, the client device 10 may receive a response from each of the mapping devices 16 with the response indicating whether a respective mapper has a valid address for the gateway 14 or not. Since only one of the mapping devices 16 will have a valid address for the gateway 14, one of the mapping devices will indicate that it has a valid address, while the other mapping devices will indicate that they do not have a valid address for the gateway. In addition to indicating the validity of the address, the mapping device 16 that has the valid address may provide the valid address to the client device 10.

In order to provide security for the messages exchanged between the client device 10 and the plurality of mapping devices 16, the messages may be secured. In one example, the messages exchanged between the client device 10 and the plurality of mapping devices 16 may include a payload of a first protocol, such as IPv6, tunneled within a packet of a second protocol, such as IPv4. In order to permit authentication of the client device 10, the payload of a message provided by the client device to the plurality of mapping devices 16 may include an address of the client device, such as the MAC address of the client device. Upon receipt, the plurality of mapping devices 16 may access the payload and may then authenticate the message based upon the address, such as a MAC address, of the client device 10, such as by comparing the address from the payload with a predefined address of the client advice that is permitted access to the plurality of mapping devices. In response, the plurality of mapping devices 16 may transmit messages to the client device 10 that again include a payload including an indication as to whether a candidate address generated by the respective mapping device is valid or invalid and, if valid, further including the candidate address itself. The payload of the messages provided by the mapping devices 16 may also include, for example, an address, such as a MAC address, of the mapping device to permit authentication by the client device 10. In one embodiment, the payload of the messages may be configured in accordance with a first protocol, such as IPv6, tunneled within a second protocol, such as IPv4. As such, the client device 10 can access the payload in order to determine if a respective mapping device 16 has a valid or invalid address for the gateway 14 and, in the event of a valid address, may also receive the address itself. The client device 10 may also authenticate the mapping device based upon the address, such as the MAC address, of the respective mapping device included within the payload in comparison to predefined addresses of the mapping devices with which the client device intends to communicate.

As shown in block 34 of FIG. 4, the client device 10, such as the processor 22 of the client device, either directly or through direction of the communication interface 26 by the processor, may cause communication to be established with the gateway 14 utilizing the address received from the respective mapping device 16 and designated to be valid. As the respective mapping device 16 has provided the client device 10 with a valid address of the gateway 14, the gateway may receive the communications from the client device and forward the communications, as appropriate, to the network 12 and may similarly provide any response or reply from the network to the client device. As described above with the communications between the client device 10 and the plurality of mapping devices 16, the communication between the client device and the gateway 14 may be secured, such as by tunneling a payload of a first protocol, such as IPv6, within a packet of a second protocol, such IPv4. In order to permit authentication, the payload may include an address, such as the MAC address, of the source of the message, such as either the client device 10 or the gateway 14. The recipient of the message, such as the other of the client device 10 or the gateway 14, may access the payload and may authenticate the message based upon a comparison of the address included within the payload with a predefined address within which communication is to be supported.

In order to increase the security of the network 12 with which the gateway 14 is associated, the address of the gateway may be repeatedly rotated or changed. In this regard, the address of the gateway may be rotated on a periodic basis or otherwise. In one embodiment, the gateway 14, such as the processor 22 embodied by the gateway, is configured to rotate the address based upon a predefined algorithm that defines a valid address for the gateway at each instant in time. As described above, the gateway 14, such as the processor 22 embodied by the gateway and, in one embodiment, a plurality of virtual machines instantiated by the processor, may be configured to generate a plurality of candidate addresses, one of which is valid and the remainder of which are invalid, upon rotation of the address of a gateway. In order to permit continued communication by the client device 10 with the network 12 via the gateway 14, the client device may also be informed of the change in the address of the gateway.

In one embodiment, the gateway 14, such as the processor 22 embodied by the gateway, either directly or through direction of the communication interface 26 by the processor, may cause a message to be provided to the plurality of mapping devices 16 indicating that the address of the gateway has changed. In one embodiment, the new address of the gateway 14 may be provided via the message that is directed from the gateway to the plurality of mapping devices 16. In another embodiment, however, the gateway 14 may simply inform the plurality of mapping devices 16 that the address of the gateway has changed and the plurality of mapping devices, such as a plurality of virtual machines embodied by the respective mapping devices, may be configured to generate a plurality of candidate addresses for the gateway, one of which is the new valid address for the gateway and the remainder of which are invalid. In this embodiment, the plurality of mapping devices 16 may operate in accordance with the same predefined algorithm implemented by the gateway 14 such that the generation of a valid address by the gateway and a respective one of the mapping devices remains synchronized as the address of the gateway rotates. Still further, both the gateway 14 and the mapping devices 16 may be configured to rotate the address of the gateway in accordance with both a predetermined schedule and a predefined algorithm. As shown in FIG. 1, the gateway 14 of this embodiment need not establish a communications link with the mapping devices 16 and, instead, the gateway and the mapping devices may operate independently while remaining in synchronization regarding the rotation of the address of the gateway in accordance with both a predetermined schedule and a predefined algorithm.

The plurality of mapping devices 16 may, in turn, communicate with the client device 10 in order to notify the client device that the address of the gateway 14 has changed. In one embodiment, the plurality of mapping devices 16 may provide the valid address to the client device 10. In another embodiment, the client device 10 may query the plurality of mapping devices 16 for the new address of the gateway 14 and may receive responses from each of the mapping devices, one of which provides the new valid address for the gateway and the others of which notify the client device that their candidate addresses are invalid. In either embodiment, the apparatus 20 embodied by the client device 10, such as the processor 22, the communication interface 26 or the like, may be configured to receive an indication that the address of the gateway 14 has changed to a different address. See block 36. Thereafter, the client device 10 may communicate with the gateway 14 and, in turn, the network 12 utilizing the new valid address for the gateway. In this regard, the apparatus 20 embodied by the client device 10, such as the processor 22, the communication interface 26 or the like, may cause communication to be established with the gateway 14 utilizing the different address. See block 38.

As described above, the messages exchanged between the gateway 14 and the plurality of mapping devices 16 and between the plurality of mapping devices and the client device 10 may be secured, such as by tunneling a payload of a first protocol, such as IPv6, within a packet of a second protocol, such as IPv4. Further, an address, such as the MAC address, of the source of the message may be included within the payload to permit the recipient of the message to authenticate the source.

This process of rotating the address of the gateway 14 with the plurality of mapping devices 16 and the gateway remaining in synchronization with respect to the current valid address of the gateway, and the client device 10 being advised of the current valid address of the gateway may be repeated any number of times. As such, a hacker or other individual or device that should not have access to the network 12 will have difficulty in determining the address of the gateway 14 and, even in the event that the address is so determined, the address will change so as to effectively limit any access that could be nefariously gained to the network.

With reference to FIG. 5, the operations performed by an apparatus 20 embodied by a gateway 14 are illustrated. In this regard, the apparatus 20 embodied by the gateway 14, such as the processor 22, initially defines an address of the gateway, such as an IP address. See block 40 of FIG. 5. For example, the gateway 14 may define a plurality of candidate addresses as described above in conjunction with FIG. 3 with one of the candidate addresses being valid and the remainder of the candidate addresses being invalid. Once the client device 10 has determined the current address of the gateway 14 in a manner described above in conjunction with FIG. 4, the gateway may receive a message from the client device utilizing the address that has been currently defined by the gateway. In this regard, the apparatus 20 embodied by the gateway 14, such as the processor 22, the communications interface 26 or the like, may be configured to receive a message from the client device 10 utilizing the address that has defined. See block 42. The apparatus 20 embodied by the gateway 14, such as the processor 22, the communications interface 26 or the like, may then establish communication with the client device 10 utilizing the address that has been defined for the gateway such as the client device and a network 12 may communicate. See block 44.

In order provide enhanced security for the network 12, the address of the gateway 14 may be repeatedly rotated or changed over time. As shown in operation 46 of FIG. 5, the apparatus 20 embodied by the gateway 14, such as the processor 22, may rotate the address by changing to a different address. The apparatus 20 embodied by the gateway 14, such as the processor 22, the communication interface 26 or the like, may then cause the client device 10 to be notified that the address of the gateway has changed to the different address. See block 48. In this regard, the gateway 14 may advise the plurality of mapping devices 16 as to the change in the address of the gateway such that the client device 10 may, in turn, be advised of the change in the address of the gateway in the manner described above. Thereafter, the apparatus 20 embodied by the gateway 14, such as the processor 22, the communications interface 26 or the like, may communicate with the client device 10 utilizing the different address, that is, the new valid address for the gateway, such that communication between the client device and the network 12 may continue even though the address of the gateway has changed. The address may repeatedly change and the client device 10 may be repeatedly informed of the change in the valid address for the gateway 14. However, the repeatedly changing address of the gateway 14 will increase the difficulty experienced by hackers or other individuals or devices that are not to access the network 12 in their efforts to nefariously communicate with the network.

In order to further secure the network 12, the network may be configured to operate in accordance with each of a plurality of different operating systems, such as Windows, Linux, etc. As such, each of the addresses of the gateway 14 may be associated with a respective operating system. While many of the addresses of the gateway 14 may be associated with the same operating system, one or more of the addresses of the gateway of this embodiment may be associated with a different operating system. Thus, in an instance in which the valid address of the gateway 14 changes from an address associated with a first operating system to an address associated with a second, different operating system, the network 12 may be configured to change the operating system by which it operates from the first operating system to the second, different operating system in synchronization with the change of the valid address for the gateway. While this change in operating system may be transparent for the client device 10, a hacker or other individual or device that is attempting to access the network 12 in an impermissible manner not only has a challenge of attempting to repeatedly determine the address of the gateway 12 as the address changes, but will find its efforts to access and utilize the network to be thwarted by the change in the operating system in accordance with which the network operates.

Accordingly, the system and method of an example embodiment of the present disclosure provide for increased security of a network 12 that is accessible by a client device 10 via a gateway 14. In this regard, the system and method of an example embodiment provide increased security for the network 12 by repeatedly changing the address of the gateway 14. Additionally, increased security may be provided in one embodiment by also changing the operating system via which the network 12 operates, such as in synchronization with the changing of the address of the gateway 14.

Many modifications and other embodiments of the disclosure set forth herein will come to mind to one skilled in the art to which these embodiments pertain having the benefit of the That which is claimed:

1. A client device comprising a processor configured to:
query a plurality of mapping devices to solicit an address of a gateway;
receive: (i) the address of the gateway from a first mapping device and (ii) responses from one or more mapping devices, other than the first mapping device, in response to the query that indicate that the one or more other mapping devices do not have a valid address for the gateway;
cause communication to be established with the gateway utilizing the address received from the first mapping device;
receive an indication that the address of the gateway has changed to a different address; and
thereafter cause communication to be established with the gateway utilizing the different address.

2. The client device according to claim 1 wherein the processor is further configured to repeatedly receive an indication that the address of the gateway has changed to a different address and thereafter cause communication to be established with the gateway utilizing the different address.

3. The client device according to claim 1 wherein the processor is further configured to communicate with the gateway by tunneling a payload of a first protocol within a packet of a second protocol.

4. The client device according to claim 3 wherein the payload includes a media access control (MAC) address of the client device.

5. The client device according to claim 3 wherein the first protocol is internet protocol version 6 (IPV6) and the second protocol is internet protocol version 4 (IPV4).

6. A method comprising:
querying a plurality of mapping devices to solicit an address of a gateway;
receiving: (i) the address of the gateway from a first mapping device and (ii) responses from one or more mapping devices, other than the first mapping device, in response to the query that indicate that the one or more other mapping devices do not have a valid address for the gateway;
establishing communication, utilizing a processor, with the gateway utilizing the address received from the first mapping device;
receiving an indication that the address of the gateway has changed to a different address; and
thereafter communicating with the gateway utilizing the different address.

7. The method according to claim 6 further comprising repeatedly receiving an indication that the address of the gateway has changed to a different address and thereafter causing communication to be established with the gateway utilizing the different address.

8. The method according to claim 6 further comprising communicating with the gateway by tunneling a payload of a first protocol within a packet of a second protocol.

9. The method according to claim 8 wherein the payload includes a media access control (MAC) address of the client device.

10. The method according to claim 8 wherein the first protocol is internet protocol version 6 (IPV6) and the second protocol is internet protocol version 4 (IPV4).

11. A gateway comprising a processor configured to:
concurrently define a plurality of candidate addresses including a single valid address of the gateway and one or more invalid addresses;
receive a message from a client device utilizing the address defined by the gateway, wherein the client device is configured to receive: (i) the address of the gateway from a first mapping device and (ii) responses from one or more mapping devices, other than the first mapping device, in response to a query that indicate that the one or more mapping devices do not have a valid address for the gateway;
establish communication with the client device utilizing the address defined by the gateway; and
rotate the address of the gateway by:
changing to a different valid address, wherein changing to a different valid address comprises concurrently defining a second plurality of candidate addresses including the different valid address and one or more invalid addresses;
causing the client device to be notified that the address of the gateway has changed to the different address; and
thereafter communicating with the client device utilizing the different address.

12. The gateway according to claim 11 wherein the processor is further configured to repeatedly rotate the address of the gateway.

13. The gateway according to claim 11 wherein the processor is further configured to communicate with the client device by tunneling a payload of a first protocol within a packet of a second protocol.

14. The gateway according to claim 13 wherein the first protocol is internet protocol version 6 (IPV6) and the second protocol is internet protocol version 4 (IPV4).

15. The gateway according to claim 11 wherein the processor is further configured to authenticate the client device based upon a media access control (MAC) address of the client device included within communications received from the client device.

16. The gateway according to claim 11 wherein the processor is configured to cause the client device to be notified by causing a plurality of mapping devices to be notified that the address of the gateway has changed to the different address.

17. The gateway according to claim 11 wherein the address and the different address are associated with different operating systems.

18. The gateway according to claim 17 wherein the processor is further configured to operate in accordance with a different operating system while the gateway has the different address than while the gateway has the address.

19. The gateway according to claim 11 wherein the processor is further configured to rotate the address by causing a message to be provided to a plurality of mapping devices that indicates that the address of the gateway has changed.

* * * * *